June 29, 1937.   R. A. RODRICK   2,085,608
WINDSHIELD ICE REMOVER
Filed Dec. 24, 1936
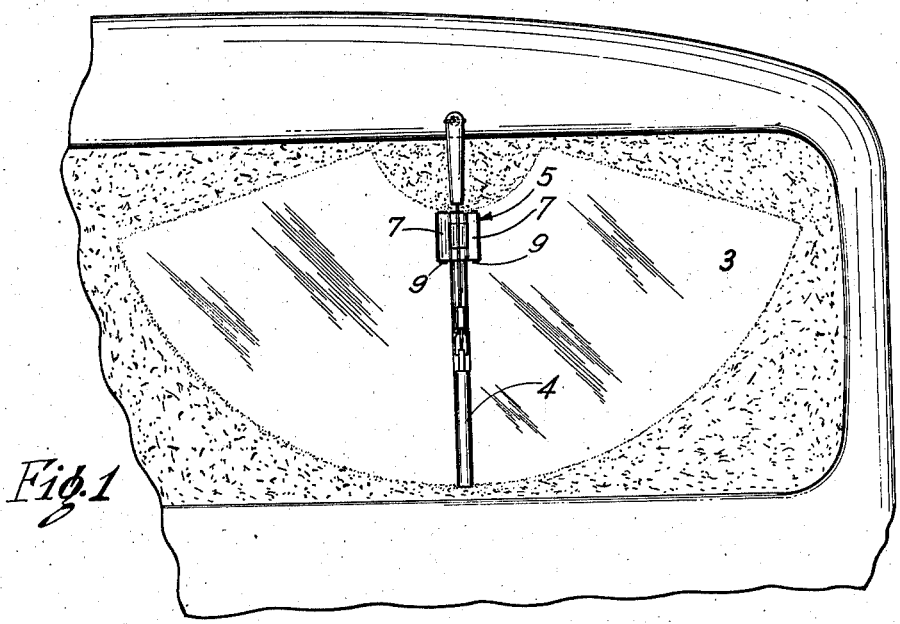
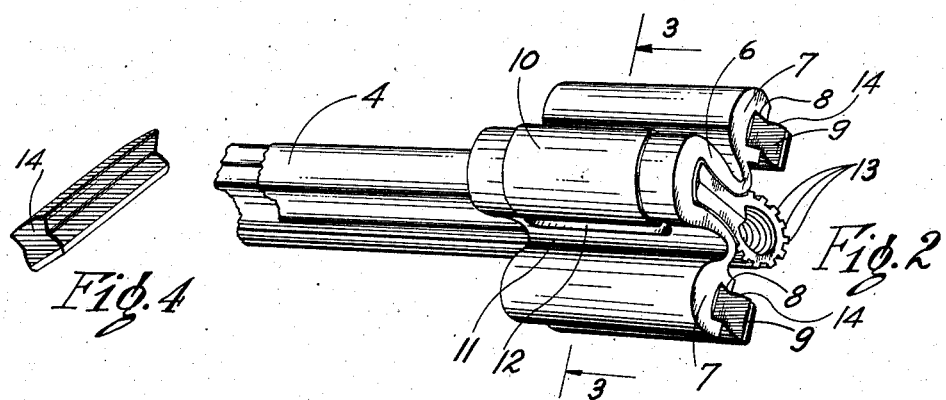
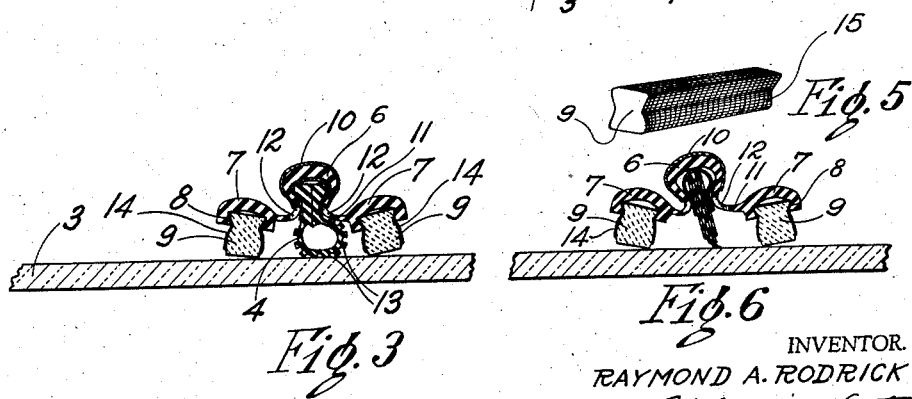
INVENTOR.
RAYMOND A. RODRICK
BY
ATTORNEYS Patented June 29, 1937

2,085,608

UNITED STATES PATENT OFFICE 2,085,608

WINDSHIELD ICE REMOVER

Raymond A. Rodrick, Akron, Ohio, assignor to The Sleetex Company, Inc., New York, N. Y.

Application December 24, 1936, Serial No. 117,428

7 Claims. (Cl. 15—250)

This invention relates to windshield cleaning apparatus and more particularly to a device adapted to remove frost and ice from the automobile windshield.

Recent improvements in motor vehicles and highways have resulted in general year around use of the automobile. Although most of the dangerous and disagreeable conditions of winter driving have been obviated, the formation of ice or sleet on the windshield still constitutes one of the major hazards of driving in cold weather. Numerous attempts have been made to prevent the formation of or to effect the removal of ice on the windshield. Many of the devices heretofore provided to maintain good visibility through the windshield by ice removal are open to the objection of high initial cost, high maintenance cost, or partial obscurement of the vision due to their construction.

It is among the objects of my invention to provide a simple, efficient ice or sleet removing device which may be quickly and easily attached to or removed from a windshield wiper blade and which will not alter or impair the normal windshield wiping action of said blade. It is a further object of my invention to provide a windshield ice remover which is arranged to apply an ice dissolving chemical directly to the ice or glass. It is a further object of my invention to provide an ice remover which will resiliently position an ice dissolving chemical unit against the ice or the windshield and which is removably attached to a windshield wiper blade. It is a further object of my invention to provide an ice remover made of rubber which will hold an ice dissolving chemical unit against the ice or the windshield. It is a further object of my invention to provide an ice removing device for automobile windshields in which a soluble chemical block is insulated over a portion of its exterior to retard the solubility of the block and improve the operation of the device. It is a further object of my invention to provide an ice remover which is adapted to be carried by a windshield wiper blade which is designed so as to "flop" during its windshield wiping action. It is also an object of my invention to provide an ice remover which is suited for operation with a wiper blade so constructed as to obviate the necessity of "flop" during its windshield wiping action, such as, for instance, a wiper blade constructed according to the disclosure in my copending application Serial No. 85,189, filed June 15, 1936. It is a further object of my invention to provide an ice remover which will employ a salt block formed under pressures such as will modify the granular or crystalline structure of the salt. It is a further object of my invention to provide an ice remover which may be attached to a windshield wiper blade and which will support salt block units in contact with the ice to be removed and wherein the blocks and the holder are formed with interfitting parts facilitating replacement of the salt block unit.

Further objects and advantages will appear from the following description and the appended drawing wherein:

Figure 1 is an elevation of an ice removing device constructed according to my invention as mounted upon a windshield wiper blade.

Figure 2 is an enlarged perspective view of the ice remover as mounted upon the windshield wiper blade;

Figure 3 is a transverse sectional view of the ice remover taken along the line 3—3 of Figure 2;

Figure 4 is a perspective view illustrating the insulation or water-proofing of an element of my invention.

Figure 5 is a perspective view of a modified form of ice removing unit constructed according to my invention;

Figure 6 is a sectional view of an ice remover constructed according to my invention fitted to a wiper blade designed to "flop" in its windshield cleaning action.

Preferably the ice remover as made according to my invention comprises an extruded or molded rubber saddle member 5 having a U-shaped central portion as at 6 adapted to embrace the back or holder element of a windshield wiper blade 4. Although I have illustrated the ice remover in Figures 1, 2 and 3 as being applied to a tubular windshield wiper which does not "flop" during the wiping of the windshield, it will be understood as the description proceeds that the ice removing device is suited to and operates efficiently with windshield wiper blades which "flop" as the blade oscillates from one side of the windshield to the other. Extending laterally on each side of the central portion 6 are chemical holders 7 provided with a dovetailed groove 8 on their forward face and a block 9 formed from a chemical adapted to react with ice formed on the windshield 3. The blocks are each provided with ribs proportioned to fit within the groove 8. To give the central portion 6 of the ice remover the desired rigidity and an adjustable clamping action it is preferably provided with a U-shaped metallic member 10 or other reinforcing means. The holders 7 on each side of the central portion 6 are connected thereto by a web 11 which is constructed of a flexible material and so proportioned that it may flex freely and urge the ice removing chemicals toward the glass and will not interfere with the normal wiping action of the wiper blade. In the embodiment shown the web 11 is slotted as at 12 through a portion of its length to render the web more flexible and yet permit the maintenance of considerable material cross section joining the central portion 6 to the holders 7.

I prefer to form the blocks 9 of salt or sodium chloride and shape the blocks as shown in the drawing by a molding or pressing operation. I have found that by subjecting the salt to pressures exceeding 100,000 pounds per square inch that the particles of salt or sodium chloride are broken or the sharp corners removed and the block resulting from the molding or pressure operation acquires a smooth hard finish. It will be understood by those skilled in the art that other ice removing chemicals or instrumentalities may be carried by the holders 7.

Subsequent to the forming of the salt or other ice removing chemical block I prefer to coat the same over the major portion of the exterior thereof with an insulating or water-proofing material 14 such as lacquer. As indicated in Figure 4 this water-proofing coating or insulation 14 covers all of the back and substantially all of the sides and ends of the block, leaving only the working face or forward face thereof uncoated. Among the advantages associated with the insulating of the block is that the dissolving action of the solution is restricted to the forward face of the block and that part of the block which is gripped in the groove 8 is preserved or protected. The coating of the sides of the block retards the dissolution of the block and permits only a solution of the working surface which results in a long useful life. The absence of any appreciable dissolution or disintegrating action in the holding portion of the block within the groove 8 results in the same being efficiently gripped throughout the useful life of the block.

When ice forms or tends to form on the windshield and it is desired to use the ice remover above described, the device may be attached by sliding the same over the back of the wiper blade and is frictionally held thereon preferably adjacent the upper end thereof by the gripping of the rubber and/or the metal saddle 10. As the wiper arm swings across the windshield indicated at 3 in the drawing the forward face of the blocks 9 may bear against the ice or moisture on the glass and the ice or moisture brought into contact with the block 9 forms a brine solution. This brine solution is distributed over the surface of the windshield by gravity and/or the action of the wiper blade and said brine solution then carries additional ice into solution. So long as moisture is present on the surface of the glass, whether this moisture be the result of ice, sleet or rain, a brine solution will be maintained within the sweep of the wiper blade.

In Figure 5 I have shown a modified form of salt or similar ice removing block wherein the entire block 9 is enclosed within a tubular fabric member 15. During the manufacture of the ice removing device the tubular fabric member 15 is preferably dipped in a brine solution so as to produce upon the drying thereof a coating of fine salt crystals. The conditioning of the block shown in Figure 5 by providing the fabric thereof with a coating of salt crystals results in a block which is ready for instant use by merely applying the same to an ice covered windshield. The salt crystals on the exterior of the dry fabric tube 5 immediately react with the ice to form a brine solution which permeates the fabric coating and further react with the salt block 9 therein. Among the advantages of this form of my invention is that no salt particle having sharp edges may break away from the block and scrape the glass of the windshield. After the first use of the fabric covered block, such as shown in Figure 5, it will be understood that the subsequent drying out of the block will bring about a second forming of salt crystals on the exterior and the same will be reconditioned for instant use. The initial coating of the fabric cover with salt crystals obviates any necessity for soaking or dipping the ice remover prior to its application to the windshield.

Sodium chloride blocks proportioned about as shown in the drawing and being about 1½ inches long and having about ¼ inch thereof projecting from the rubber holder are ordinarily sufficient for about eight hours' continuous operation. New blocks 9 may be inserted in the holder without removing the holder from the windshield wiper blade merely by sliding the new blocks longitudinally of the holder 7. The dovetailed grooves 8 are originally formed to have a width slightly less than the portion of the block embraced and thus the edges of the holder exert a resilient grip upon the block at all times.

Among the advantages obtained by use of an ice remover constructed according to my invention is that the salt is brought directly into contact with the ice upon attachment of the device and thus eliminates the need for any preliminary preparation of the active element. A further advantage is found in that the high pressures employed to mold the salt insure freedom from abrasive action on the glass and provide for a long life. Since the holder portion of the device is free from wear the cost of upkeep is limited to salt block refills which may be formed from a commodity costing but a few cents per pound. A further advantage of my ice remover relates to its use on the interior of the automobile. By manually wiping the inside of the windshield glass and the door glasses with the ice remover the moisture thereon forms with the salt block a brine solution that prevents frost or ice formation on the interior of the vehicle.

In connection with the operation of an ice removing device constructed according to my invention reference is made to Figure 6 which illustrates the device as applied to a wiper blade wherein the construction of the wipping element necessitates a "flopping" of the blade as it swings to and fro across the windshield. An ice remover according to my invention having flexible webs 11 permits a "flopping" of the blade shown in Figure 6 and thus will not interfere with the normal windshield wiping action of the blade. Prior to my invention ice removing devices supported by the windshield wiper were so constructed and arranged as to prevent the normal "flopping" action of that type of blade such as shown in Figure 6. From an understanding of the flexing in the webs 11 in my ice remover device when carried by a "flopping" type of blade it will be appreciated that other flexible means than the specific slotted web I have shown and described in connection with my preferred embodiment may be employed.

During the operation of my ice removing device when used with a wiper blade according to my said copending application, which blade is designed to operate without "flop" (Figure 3) the brine solution gathered by the forward ribs of the wiper blade is moved longitudinally of the blade by the said ribs by the action of gravity and the action of centrifugal force. This results in a fresh brine solution being spread throughout the area of the windshield within the sweep of the blade during the operation of the device. Any insoluble obstacles or bumps on the surface being wiped are accommodated in the ice removing device by a flexing of the web 11 which flexing will not raise the tubular blade from the glass nor adversely effect the wiping action of the blade.

Although I have described one embodiment of my invention in considerable detail, it will be appreciated by those skilled in the art that colorable variations may be made therein without departing from the spirit of the invention as defined in the appended claims.

I claim:

1. In combination, a windshield wiper blade secured to a wiper arm and adapted to be swept across a windshield glass, means engaging said wiper blade and extending laterally therefrom, said means comprising a piece of rubber proportioned to frictionally embrace said wiper blade, a longitudinal groove formed in the laterally extending portion of said means and a salt block frictionally held in said groove and arranged to bear directly against ice formed on said windshield.

2. An ice remover comprising a rubber block having a saddle portion arranged to frictionally fit over the back of a windshield wiper blade, a web extending laterally from said saddle, a holder for an ice dissolving chemical integrally formed with said laterally extending web and a block of an ice dissolving chemical having a part thereof frictionally retained in said holder.

3. An ice remover comprising a molded rubber block having a saddle portion arranged to frictionally fit over the back of a windshield wiper blade, a flexible web extending laterally from said saddle, a slot formed in said web, an ice dissolving chemical holder integrally formed with said laterally extending web and a block of an ice dissolving chemical having a part thereof frictionally retained in said holder.

4. An ice remover comprising a rubber saddle portion adapted to embrace the back of a windshield wiper blade, a metallic back embracing said rubber saddle portion and holding the same against the sides of said blade, a pair of laterally extending webs integrally formed along the lower edges of said saddle, chemical holders integrally formed with said webs and saddle at the outer edges of said webs, an ice removing chemical block secured to said holder by interfitting portions on said holder and block.

5. An ice remover comprising a member adapted to frictionally engage a windshield wiper blade, a rubber block holder secured to said member, a dovetailed groove formed in said holder, an ice dissolving chemical block provided with a tongue shaped to fit said dovetailed groove and be resiliently gripped therein by the overhanging walls of said groove.

6. An ice remover comprising a rubber saddle portion adapted to embrace the back of a windshield wiper blade, a metallic back embracing said rubber saddle portion and holding the same against the sides of said blade, a laterally extending web integrally formed along a lower edge of said saddle, a chemical holder integrally formed with said web and saddle at an outer edge of said web, an ice removing chemical block secured to said holder by interfitting portions on said holder and block.

7. In combination, a windshield wiper blade secured to a wiper arm and adapted to be swept across a windshield glass, means engaging said wiper blade and extending laterally therefrom, said means comprising a piece of rubber proportioned to frictionally embrace said wiper blade, a longitudinal groove formed in the laterally extending portion of said means and a salt block frictionally held in said groove and arranged to bear directly against ice formed on said windshield, said salt block provided with a water resistant lacquer insulating cover throughout the portion thereof frictionally held in said groove.

RAYMOND A. RODRICK.